United States Patent

[11] 3,574,296

| [72] | Inventors | Claus Prochnow;<br>Kurt Bode, Braunschweig, Germany |
|---|---|---|
| [21] | Appl. No. | 762,675 |
| [22] | Filed | Sept. 23, 1968 |
| [45] | Patented | Apr. 13, 1971 |
| [73] | Assignee | Rollei-Werke Franke & Heidecke<br>Braunschweig, Germany |
| [32] | Priority | Sept. 23, 1967 |
| [33] | | Germany |
| [31] | | R35981 and P 12 74 439.7 |

[54] CASSETTE FOR ROLLFILM CAMERAS
8 Claims, 4 Drawing Figs.

[52] U.S. Cl. .................................................. 95/31
[51] Int. Cl. .................................................. G03b 19/04
[50] Field of Search .................................. 95/31, 71, 34, 19

[56] References Cited
UNITED STATES PATENTS

| 1,695,382 | 12/1928 | McCandless | 95/34 |
| 2,319,530 | 5/1943 | Bolsey | 95/34 (UX) |
| 2,462,683 | 2/1949 | Schwartz | 95/71 |
| 2,471,522 | 5/1949 | Garrett | 95/19 |
| 2,576,811 | 11/1951 | Schwartz | 95/71 |
| 2,582,044 | 1/1952 | Kurkjian | 95/71 |
| 2,715,358 | 8/1955 | Clayton | 95/71 |
| 2,716,929 | 9/1955 | Smith | 95/34 |
| 3,261,276 | 7/1966 | Machan | 95/71(X) |

*Primary Examiner*—John M. Horan
*Assistant Examiner*—Russell E. Adams, Jr.
*Attorneys*—Charles Shepard and Stonebraker & Shepard ABSTRACT: A rollfilm cassette for detachable mounting on the body portion of a camera. The cassette has a protective slide to be inserted in the cassette before removal from the camera, to prevent fogging of the film when the cassette is removed. An interlock responsive to the presence or absence of the protective slide prevents the release of the latch which unlatches the cassette from the camera body, unless the protective slide is properly inserted in the cassette. The cassette has a hollow backwall providing a chamber in which to keep the protective slide when the slide is removed from its protecting position so that exposures can be made on the film.

3,574,296

CASSETTE FOR ROLLFILM CAMERAS

BACKGROUND OF THE INVENTION

Cameras having detachable cassettes for holding rollfilm are well known in the art. The present invention relates to improvements in the cassette itself, and the details of the camera body with which the cassette is used are unimportant for purposes of the present invention and are not illustrated.

According to one feature of the invention, a latch on the cassette engages a suitable member (such as a pin) on the camera body when the cassette is properly mounted on the body, and a movable release member on the cassette is operable to release the latch so that the cassette can be removed. A protective slide inserted in a slide guideway in the cassette protects the film in the cassette against fogging when it is removed.

An object of the invention is the provision of improved, simple, and inexpensive mechanism blocking the release movement of the latch release member except when a protective slide is properly positioned in the cassette. Thus accidental removal of the cassette from the camera body, without first putting the protective slide in position, is prevented.

According to another feature of the invention, the rear wall of the cassette is made hollow, with a slot in which the protective slide can be conveniently kept while pictures are being taken; that is, while the slide is out of its protective position in the cassette.

Another object of the invention is the provision of simplified means of this kind for holding the protective slide when it is not performing its protective function.

According to another feature of the invention, the slot for containing the slide when not in use is faced in an opposite direction from the slot in which the slide is placed in order to perform its protective function, thereby minimizing the risk of having the user place the slide inadvertently in the wrong slot.

BRIEF DESCRIPTION OF THE DRAWINGS

In the accompanying drawings, which are incorporated herein by reference and constitute a material part of the disclosure, and which illustrate a preferred embodiment of the invention merely by way of example.

DESCRIPTION OF THE PREFERRED EMBODIMENT

As already indicated, cameras with detachable cassettes for holding the film are well known in the art. The details of the camera construction, as well as the details of the way in which the film is held in the cassette and is advanced from frame to frame for making successive exposures, are not important for purposes of the present invention, and such details may be of any conventional kind known in the art. Merely as an example, the present cassette may be used with a camera of the kind disclosed and the cassette itself may embody constructional features such as disclosed in the copending application of the present applicants, Ser. No. 667,030, filed Aug. 25, 1967, now U.S. Pat. No. 3,507,197, issued Apr. 21, 1970.

Figures 1, 2, 3:
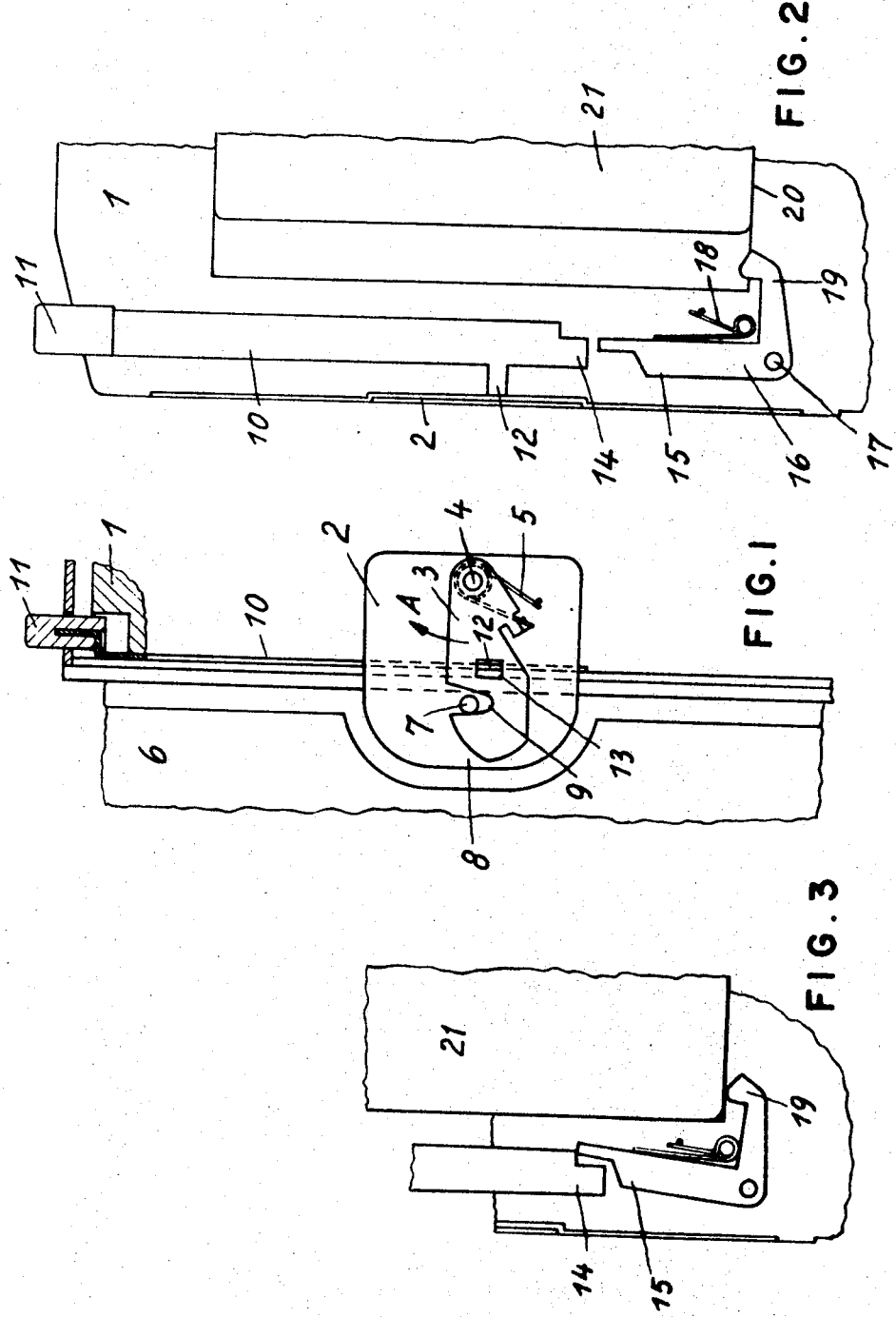
FIG. 1 is a fragmentary view partly in elevation and partly in section, illustrating a portion of the cassette and a portion of the camera body and showing the latching mechanism for holding the parts together.
FIG. 2 is a view taken at right angles to the direction of FIG. 1, illustrating the protective slide in partially open position.
FIG. 3 is a view similar to a fragment of FIG. 2, illustrating the protective slide in fully closed position.

Referring now to FIGS. 1—3, the cassette fragmentarily shown at 1 is provided with one or more projections such as the plate 2 which enters into a corresponding recess in the camera body, a fragment of which is shown at 6, when the cassette is mounted in operative position on the camera body.

On this plate or part 2 of the cassette is a latch 3 pivoted at 4 and urged by a hairpin spring 5 to turn clockwise in the direction of the arrow A, so that the notch or groove 9 of the latch member 3 will engage over a suitable stationary part of the camera body such as the pin 7. The forward end of the latch 3 is sloped obliquely at 8 so that as the cassette is brought into position against the back of the camera body, the latch will be cammed aside by engagement with the pin 7 and then will snap over the pin 7 when the notch 9 reaches the pin.

Movable longitudinally in the cassette is the bar 10 terminating in an externally accessible knob or button 11 which may be pressed inwardly when it is desired to release the cassette from the camera body. A lateral extension 12 on the bar 10 engages an opening 13 in the latch 3, so that when the bar or rod 10 is moved longitudinally by pressure on the button 11, the latch 3 will be swung to an open position against the force of the spring 5.

The inner end 14 of the bar 10 is in the vicinity of the end 15 of a bellcrank lever 16 pivoted at 17 within the cassette, and urged by a spring 18 in a counterclockwise direction. The second arm 19 of the bellcrank lever 16 extends slightly into the slide guideway 20 in which the protective slide 21 is placed when it is desired to remove the cassette and protect the film therein against fogging. The proportions of the parts are so arranged that when the slide 21 is not fully engaged in the guideway 20 in its fully protective position, the arm 15 of the bellcrank lever 16 is aligned with and closely adjacent to the end 14 of the bar 10, so that the bar 10 cannot be moved far enough to release the latch 3. Therefore the cassette cannot be removed from the camera body. This is the position of the parts shown in FIG. 2.

However, when the slide 21 is fully inserted all the way in its guideway 20, the edge of the slide engages the feeler arm 19 of the bellcrank lever 16 and turns the bellcrank lever slightly clockwise against the force of its spring 18, thereby shifting the arm 15 to a position where it no longer obstructs the end 14 of the release bar 10. Then the button 11 may be depressed, releasing the latch 3 so that the cassette may be removed.

Merely as an example, the pivoted latch is shown as being mounted on the cassette rather than on the camera body. Of course the relationship of the parts may be reversed, placing the pivoted latch on the camera body rather than on the cassette, and the bellcrank lever 16 can be shaped so that when the protective slide is not in proper protecting position, the bellcrank lever 16 will block movement of the latch releasing bar mounted on the camera body rather than on the cassette.

It will be noted from FIG. 3 that the inner end 14 of the bar 10 is preferably stepped, and the cooperating end of the arm 15 of the bellcrank 16 is likewise preferably stepped, the formation being such that the arm 15 forms a limiting stop for the releasing motion of the bar 10 when the parts are in the position of FIG. 3, thus limiting the inward motion of the bar to an extent which will release the latch 3 while avoiding excessive motion without requiring any separate stop or abutment.

Figure 4:
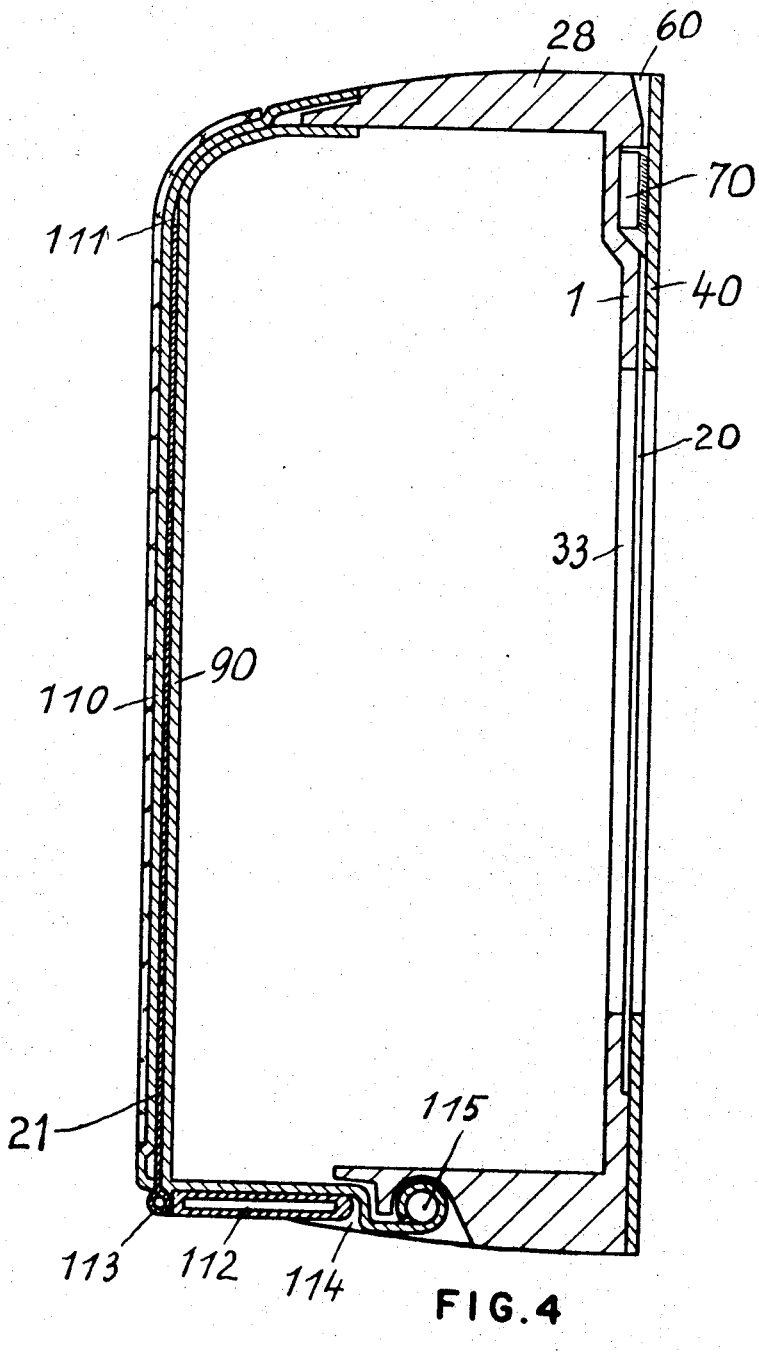
FIG. 4 is a section taken centrally through the cassette, particularly illustrating the guideway for receiving the slide when it is in a protecting position and the guideway or slot receiving the slide for storage purposes, with the slide therein.

Referring now to FIG. 4, the light passage or film gate of the cassette 1 is shown at 33. The slide guideway 20 previously mentioned, in which the slide 21 is placed, is preferably formed by using a separate plate 40 slightly spaced from and parallel to the main body of the cassette, leaving the guideway space between them. The entrance slot for the guideway is shown at 60, and entrance of stray light into the slot, when the slide is removed, is prevented by the usual conventional sealing member 70.

The rear wall of the cassette (that is, the wall opposite to the film gate or exposure opening 33) is preferably formed as a double wall, having the two thicknesses 90 and 110 slightly spaced from each other to leave the slit or passageway 111 between them, this slit being of the appropriate size to receive and frictionally retain the protective slide 21 as a convenient place to keep it when the slide if removed from the guideway 20 so that exposures may be made on the film within the cassette. The use of these double walls 90 and 110 has the further advantage of strengthening the rear wall of the cassette, so that it is unnecessary to use strengthening ribs on the rear wall as sometimes required in the prior art.

This double wall portion 90 and 110 preferably constitutes part of a hinged back or cover hinged to the rest of the cassette on the hinge 115 so that the back may be opened to insert and remove film.

Preferably the protective slide 21 is provided with a hinged handle 112 hinged to the end of the slide at 113, and this handle is normally accommodated in a recess 114 in the adjacent wall. Thus the handle is out of the way while pictures are being taken. When it is desired to remove the slide 21 from its storage slot 111 and place it in its protecting slot 20, the handle 112 may be swung out of the recess 114 to an easily accessible position and then the slide may be pulled out of the slot 111 in which it is normally held with some degree of friction so that it will not accidentally drop out during manipulation of the camera. When the slide is placed in its slot 20 in position to protect the film, the handle 112 is conspicuously obvious in the vicinity of the entrance slot 60, and thus draws the attention of the operator to the fact that the slide is in its protecting position. Also the pivoted handle at this time is easily accessible for quick grasping to withdraw the slide when required.

It will be noted especially that the entrance slot 60 through which the slide 21 is inserted into protecting position, enters in the opposite direction from the entrance of the slot 111 into which the slide is placed for storage purposes. This helps the operator to be alert to which slot he is placing the slide in, and minimizes the chance that he will inadvertently place the slide in the slot other than the one in which he intends to place it.

It is to be understood that the disclosure is given by way of illustrative example only, rather than by way of limitation, and that without departing from the invention, the details may be varied within the scope of the appended claims.

We claim:

1. A photographic camera comprising a camera body and a cassette detachably mounted on said body, a slide guideway in said cassette, a protective slide manually movable into said guideway to a position protecting film in the cassette from light and withdrawable from said guideway when pictures are to be taken, a latch for holding said cassette in mounted position on said body, a latch releasing member manually movable to a releasing position to release said latch so that the cassette may be removed from the body, and means for blocking movement of said releasing member to a releasing position when said slide is not present in said guideway, and means operated by the insertion of a slide in said guideway for rendering said blocking means ineffective.

2. A construction as defined in claim 1, in which said means for blocking movement of said releasing member comprises a pivoted feeler member spring urged into a first position extending partially into said guideway when said slide is not present therein and displaced by the slide to a second position when said slide is in film protecting position in said guideway, said feeler member when in its first position serving to block movement of said releasing member to releasing position.

3. A construction as defined in claim 2, wherein said feeler member when in its second position serves as a limit stop for limiting excess movement of said releasing member beyond releasing position.

4. A construction as defined in claim 1, wherein said latch is a pivoted latch enclosed in an inaccessible position, and wherein said release member is a bar operatively connected to said pivoted latch and having an externally accessible end adapted for manual operation when the latch is to be released for removal of the cassette from the camera body.

5. A construction as defined in claim 1, wherein said cassette has a storage slot for receiving and retaining said protective slide when said slide is not in its guideway.

6. A construction as defined in claim 5, wherein said storage slot opens on a different side of said cassette from said slide guideway, so that movement of said slide into said storage slot is in a different direction from movement of said slide into said slide guideway.

7. A photographic film cassette for detachable connection with a camera body, said cassette comprising a slide guideway, a protective slide movable into said guideway to a position protecting film in the cassette from light and withdrawable from said guideway when pictures are to be taken, and a storage slot spaced from said guideway for receiving and holding said slide when it is withdrawn from said guideway, further including a hinged handle on said slide, and an external recess in a wall of said cassette adjacent said storage slot for accommodating said handle in an approximately flush position while said slide is stored in said storage slot.

8. A photographic film cassette for detachable connection with a camera body, said cassette comprising a slide guideway, a protective slide movable into said guideway to a position protecting film in the cassette from light and withdrawable from said guideway when pictures are to be taken, a pivoted latch member on said cassette for latching it to a camera body, a release bar on said cassette for actuation to release said latch member, and a blocking member spring urged to a position blocking said release bar to prevent actuation thereof to release said latch member, said blocking member having a portion in said slide guideway in position to be engaged by a slide moving in said guideway to a protecting position and moved thereby to an unblocking position so that said release bar may be actuated to release said latch member.